United States Patent [19]

Rowlette

[11] Patent Number: 4,625,395

[45] Date of Patent: Dec. 2, 1986

[54] BATTERY PLATE CONTAINING FILLER WITH CONDUCTIVE COATING

[75] Inventor: John J. Rowlette, Monrovia, Calif.

[73] Assignee: California Institute of Technology, Pasadena, Calif.

[21] Appl. No.: 673,676

[22] Filed: Nov. 21, 1984

Related U.S. Application Data

[62] Division of Ser. No. 550,875, Nov. 14, 1983, Pat. No. 4,510,219.

[51] Int. Cl.⁴ ............................................. H01M 6/00
[52] U.S. Cl. ................................. 29/623.4; 29/623.5; 29/730
[58] Field of Search ................. 29/623.1, 623.4, 623.5, 29/730, 731; 429/212, 210, 245; 427/58, 126.1, 126.2; 264/104, 109; 156/667

[56] References Cited

U.S. PATENT DOCUMENTS

| | | | |
|---|---|---|---|
| 3,202,545 | 8/1965 | Emeriat | 429/212 |
| 3,466,193 | 9/1969 | Hughel | 429/211 |
| 3,738,871 | 6/1973 | Scholle | 429/241 X |
| 3,819,412 | 6/1974 | Taylor et al. | 429/210 |
| 4,098,967 | 7/1978 | Biddick et al. | 429/210 |
| 4,125,680 | 11/1978 | Shropshire et al. | 429/210 X |
| 4,275,130 | 6/1981 | Rippel et al. | 429/210 X |
| 4,326,017 | 4/1982 | Will | 429/228 |
| 4,339,322 | 7/1982 | Balko | 429/210 X |

Primary Examiner—Charles F. LeFevour
Attorney, Agent, or Firm—Marvin E. Jacobs

[57] ABSTRACT

The plate (10) comprises a matrix or binder resin phase (12) in which is dispersed particulate, conductive tin oxide such as tin oxide coated glass fibers (14). A monopolar plate (11) is prepared by coating a layer (18) of electrolytically active material onto a surface of the plate (10). Tin oxide is prevented from reduction by coating a surface of the plate (10) with a conductive, impervious layer resistant to reduction such as a thin film (22) of lead adhered to the plate with a layer (21) of conductive adhesive. The plate (10) can be formed by casting a molten dispersion from mixer (36) onto a sheet (30) of lead foil or by passing an assembly of a sheet (41) of resin, a sheet (43) of fiberglass and a sheet (45) of lead between the nip of heated rollers (48, 50).

15 Claims, 6 Drawing Figures

U.S. Patent  Dec. 2, 1986  4,625,395 ns to the weight
and the cost of the battery and often are subject to
BATTERY PLATE CONTAINING FILLER WITH CONDUCTIVE COATING

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

This is a division of application Ser. No. 550,875, filed Nov. 14, 1983, now U.S. Pat. No. 4,510,219.

TECHNICAL FIELD

The present invention relates to secondary batteries of the bipolar plate type and, more particularly, to an improved lightweight battery plate for use in fabricating bipolar or monopolar plates for lead-acid batteries.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multicell structure. Each cell contains a plurality of vertical positive and negative plates formed of lead-based alloy grids containing layers of electrochemically active pastes. The paste on the positive plate when charged contains lead dioxide which is the positive active material and the negative plates contain a negative active material such as sponge lead. This battery has been widely used in the automotive industry for many years, and there is substantial experience and tooling in place for manufacturing this battery and its components, and the battery is based on readily available materials, is inexpensive to manufacture and is widely accepted by consumers.

The open circuit potential developed between each positive and negative plate is about 2 volts. Since the plates are connected in parallel, the combined potential for each cell will also be about 2 volts regardless of the number of plates utilized in the cell. One or more cells are then connected in series to provide a battery of desired voltage. Common low voltage batteries of 6 volts have 3 serially connected cells, 12 volt batteries include 6 serially connected cells and 24 volt batteries contain 12 serially connected cells. The bus bars and top straps used for intercell connection add to the weight and the cost of the battery and often are subject to atmospheric or electrochemical corrosion at or near the terminals.

Another problem with lead-acid batteries is their limited lifetime due to shedding of the active materials from the vertically oriented positive and negative plates. During operation, these electrode materials shed and flake and fall down between the vertically oriented plates and accumulate at the bottom of the battery. After a period of operation, sufficient flakes accumulate to short circuit the grids resulting in a dead battery cell and shortened battery life.

Lead-acid batteries are inherently heavy due to use of the heavy metal lead in constructing the plates. Modern attempts to produce lightweight lead-acid batteries, especially in the aircraft, electric car and vehicle fields, have placed their emphasis on producing thinner plates from lighter weight materials used in place of and in combination with lead. The thinner plates allow the use of more plates for a given volume, thus increasing the power density. Some of these attempts have included battery structures in which the plates are stacked in horizontal configurations. Higher voltages are provided in a bipolar battery including bipolar plates capable of through-plate conduction to serially connect electrodes or cells. The horizontal orientation of the grids prevents the accumulation of flake lead compounds at the battery bottom. Downward movement of electrolyte can be blocked by use of glass or porous polypropylene mats to contain the electrolyte. Also, stratification of electrolyte is prevented since the electrolyte is confined and contained within the acid resistant mats by capillary action.

The bipolar plates must be impervious to electrolyte and be electrically conductive to provide a serial connection between cells. The bipolar plates also provide a continuous surface to prevent loss of active materials.

Most prior bipolar plates have utilized metallic substrates such as lead or lead alloys. The use of lead alloys, such as lead antimony, gives strength to the substrate but causes increased corrosion and gassing.

Alternate approaches have included plates formed by dispersing conductive particles or filaments such as carbon, graphite or metal in a resin binder such as polystyrene (U.S. Pat. No. 3,202,545), a plastic frame of polyvinyl chloride with openings carrying a battery active paste mixed with nonconductive fibers and short noncontacting lead fibers for strengthening the substrate (U.S. Pat. No. 3,466,193), a biplate having a layer of zinc and a polyisobutylene mixed with acetylene black and graphite particles for conductivity of the plate (U.S. Pat. No. 3,565,694), a substrate for a bipolar plate including polymeric material and vermicular expanded graphite (U.S. Pat. No. 3,573,122), a rigid polymer plastic frame having a grid entirely of lead filled with battery paste (U.S. Pat. No. 3,738,871), a thin, plastic substrate having lead strips on opposite faces, the lead strips being interconnected through an opening in the substrate and retained by plastic retention strips (U.S. Pat. No. 3,819,412), and a biplate having a substrate of thermoplastic material filled with finely divided vitreous carbon and a layer of lead-antimony foil bonded to the substrate for adhering active materials (U.S. Pat. No. 4,098,967).

Some more recent examples of batteries containing bipolar plates are U.S. Pat. No. 4,275,130 in which the biplate construction comprises a thin composite of randomly oriented conductive graphite, carbon or metal fibers imbedded in a resin matrix with strips of lead plated on opposite surfaces thereof. Ser. No. 279,841, filed July 2, 1981, discloses a biplate formed of a thin sheet of titanium covered with a conductive, protective layer of epoxy resin containing graphite powder.

Dispersed, conductive fibers form a conduction path by point-to-point contact of particles or fibers dispersed in an insulating matrix resin, and the through-plate serial conductivity is usually lower than desired. Fibrous fillers do increase the strength of the plate by forming a fiber-reinforced composite.

It has been attempted to increase the conductivity and strength of bipolar plates by adding a conductive filler such as graphite. Graphite has been used successfully as a conductive filler in other electrochemical cells, such as in the manganese dioxide, positive active paste of the common carbon-zinc cell, and it has been mixed with sulfur in sodium-sulfur cells. However, even though graphite is usually a fairly inert material, it is oxidized in the agressive electrochemical environment of the lead-acid cell to acetic acid. The acetate ions combine with the lead ion to form lead acetate, a weak salt readily soluble in the sulfuric acid electrolyte. This reaction depletes the active material from the paste and ties up the lead as a salt which does not contribute to production or storage or electricity. Acetic acid also attacks the lead grids of the positive electrodes during charge, ultimately causing them to disintegrate. Highly conductive metals such as copper or silver are not capable of withstanding the high potential and strong acid environment present at the positive plate of a lead-acid battery. A few electrochemically-inert metals such as platinum are reasonably stable. But the scarcity and high cost of such metals prevent their use in high volume commercial applications such as the lead-acid battery. Platinum would be a poor choice even if it could be afforded, because of its low gassing overpotentials.

A low cost, lightweight, stable bipolar plate is disclosed in my copending application Ser. No. 346,414, filed Feb. 18, 1982, for BIPOLAR BATTERY PLATE. The plate is produced by placing lead pellets into apertures formed in a thermoplastic sheet and rolling or pressing the sheet with a heated platen to compress the pellets and seal them into the sheet. This method involves several mechanical operations and requires that every aperture be filled with a pellet before heating and pressing in order to form a fluid-impervious plate.

DISCLOSURE OF THE INVENTION

An improved, lightweight conductive plate for a lead-acid battery is provided by the present invention. The plate is resistant to the electrochemical environment of the cell. The plate is prepared in a simple, reliable manner to form a low-resistance, fluid-impervious, through-conductive plate.

The conductive plate of the invention contains a dispersion in a matrix resin of a conductivity additive that is thermodynamically stable to the electrochemical environment of the lead-acid cell, both with respect to the strong sulfuric acid electrolyte and to species generated under oxidation and reduction conditions experienced during charge and discharge of the battery.

A preferred conductivity additive for the plate of the present invention is conductive tin dioxide ($SnO_2$). $SnO_2$ can be present as a powder or coated onto a particulate or fibrous substrate such as glass powder or glass wool as disclosed in my copending application Ser. No. 488,199, filed April 25, 1983, entitled IMPROVED POSITIVE BATTERY PLATE, the disclosure of which is expressly incorporated herein by reference. Stannic oxide has a conductivity several times that of graphite. $SnO_2$ (doped) has a conductivity of 300 to 400 micro ohm-cm vs. 1373 micro ohm-cm for graphite.

Stannic oxide is thermodynamically stable to the oxidation/reduction potential in the electrochemical environment of the positive plate of a leadacid battery, has about the same resistivity as $PbO_2$ when $SnO_2$ is doped with a suitable dopant such as fluoride ion, and refractory or baked type of $SnO_2$ is quite insoluble in sulfuric acid. The stannic oxide conductivity additive will remain unchanged during the course of charge and discharge of the battery.

These and many other features and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
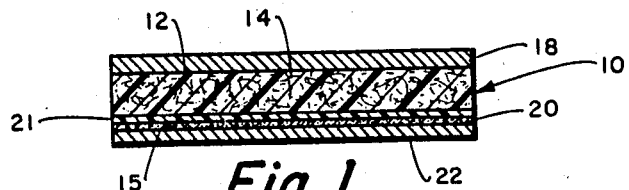
FIG. 1 is a sectional view of a bipolar plate in accordance with the invention.

Referring now to FIG. 1, the plate 10 is formed of a composite of an organic synthetic resin 12 in which is dispersed a sufficient amount of a stable filler 14 to provide through-plate conductivity. The preferred material is tin oxide in particulate form, preferably coated onto a particulate support such as glass fibers or glass particles. The glass fibers can be in roving, chopped or glass wool form. In one embodiment, the glass particles are preferably sintered into a solid sheet having a porosity from about 60 to about 90 percent. The plate 10 preferably has a thickness from about 1 to about 20 mils, more preferably from about 4 to about 10 mils.

The coating of stannic oxide onto glass to form a conductive coating was developed over 30 years ago and has been widely practiced to defrost windshields in aircraft and automobiles. The conductive coating is applied to heated glass fibers or powder or glass wool from a solution of stannic chloride in hydrochloric acid as disclosed in U.S. Pat. No. 2,564,707, the disclosure of which is expressly incorporated herein by reference. The solution can be sprayed onto the heated fibers The diameter of the glass fibers is preferably very small such as from about 1 to about 20 microns. Very fine fibers are too hard to handle and large diameter fibers have too small a surface to provide adequate conductive surface. The fibers preferably contain a conductive coating of stannic oxide ranging in thickness from a monolayer up to about 10 microns, more preferably from 0.2 micron to 2 microns.

Figure 2:
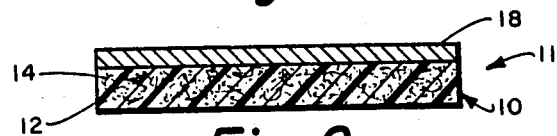
FIG. 2 is a view in section of a monopolar plate prepared in accordance with the invention.

Referring now to FIG. 2, the through-conductive plate 10 can be used as the central substrate to form a monolayer plate 11 such as a positive plate containing a layer 18 of positive active material such as lead oxide paste.

Referring back to FIG. 1, since tin oxide is not stable in the reducing environment of a negative electrode, the surface 15 facing the negative electrode must contain a layer 20 that is conductive and stable under reducing conditions. The layer 20 can be a composite of a synthetic organic resin such as epoxy or polypropylene containing containing a dispersion of about 20 to about 80 percent by weight of conductive fibers which are stable under reducing conditions such as graphite fibers or lead fibers. The layer 20 can also be a thin film or foil of lead. The layer 20 can be adhered to the plate 10 by a film 21 of conductive adhesive. The fabrication of the bipolar plate is completed by depositing a laying 22 of negative active material such as lead paste onto the layer 20.

The synthetic organic resin 12 can be thermoplastic. Preferred thermoplastics are the polyolefins such as polypropylene.

Figure 3:
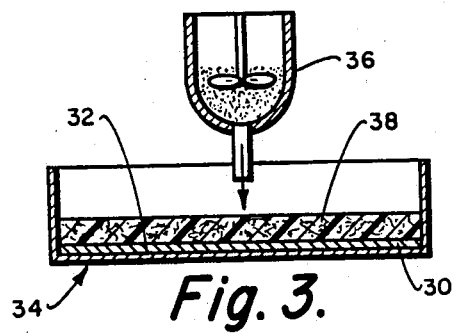
FIG. 3 is a schematic view of an apparatus for forming a bipolar plate in accordance with the invention.

The conductive plate of the invention can be readily fabricated by casting or roll molding techniques. Referring now to FIG. 3, the plate is fabricated by placing a sheet 30 of lead foil on the bottom surface 32 of the casting cavity 34. A mixture of molten resin containing at least 20 to 80 percent by weight of tin oxide coated glas fibers is then poured from the mixing kettle 36 into the casting cavity 34. After the resin cools, a conductive layer 38 attached to the lead foil 30 is formed.

Figure 4:
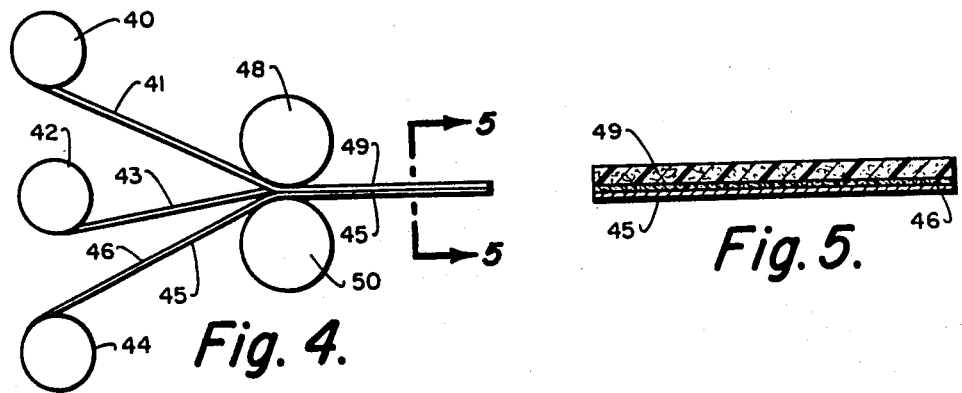
FIG. 4 is a schematic view of an alternate method for forming a bipolar plate in accordance with the invention.
Figure 5:
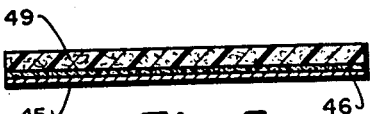
FIG. 5 is a section taken on line 5—5 of FIG. 4.

Referring now to FIG. 4, another apparatus for forming a conductive plate includes a supply roll 40 of a thermoplastic resin 41 such as polypropylene, a supply roll 42 of tin oxide coated fiberglass fabric 43 and a supply roll 44 of lead foil 45 having an upper surface coated with a layer 46 of a heat curable, conductive adhesive such as an epoxy filled with graphite fibers and/or powder. The sheet 43 of fiberglass has a thickness slightly less than that of the sheet 41 of polypropylene. When the three sheets are drawn through heated rollers 48, 50, the polypropylene 41 softens. The fabric is pressed onto the softened resin to form a composite layer 49 and also attaches the foil 45 to form the assembly as shown in FIG. 5.

The following experiments were conducted to evaluate the performance of thin films of stannic oxide in the environment of a lead-acid battery.

EXAMPLE 1

Glass plates were coated with a conductive coating of stannic oxide following the procedure of U.S. Pat. No. 3,564,707.

EXAMPLE 2

The stannic oxide coated glass plates of Example 1 were immersed in 5.3 M $H_2SO_4$ at both 20° C. and 50° C. The plates were withdrawn periodically and the resistance of the thin film coating was measured. The results of measurements during 33 days are shown in Table 1.

TABLE 1

Chemical corrosion of stannic oxide thin film in 5.301 M $H_2SO_4$.

| TIME (DAYS) | 50° C. ELECTRODE RESISTANCE Ω (20° C.) | 20° C. ELECTRODE RESISTANCE Ω (20° C.) |
|---|---|---|
| 0 | 10.95 | 10.84 |
| 1 | 10.94 | 10.84 |
| 8 | 10.95 | 10.84 |
| 16 | 10.94 | 10.84 |
| 20 | 10.94 | 10.83 |
| 26 | 10.93 | 10.82 |
| 30 | 10.93 | 10.81 |
| 33 | 10.93 | 10.81 |

During that time at both temperatures listed, the resistance change was less than 1/1000 of the film's original condition (day=0). The two samples described in the Table started with different resistance values for the reason that the plates do not have identical dimensions.

Electrochemical corrosion tests were run utilizing a PARC potentiostat, Model 173, to apply a constant potential to either the cathode or anode in the electrochemical cell. This was done by setting the potential of one of the electrodes relative to a saturated calomel reference electrode (SCE). Two tests were run simultaneously in separate cells. One case corresponded to the SOTF used as an anode (positive terminal) with a fixed potential. The counter electrode was a Pt foil. The second case has the SOTF situated as the cathode, again using the Pt foil as the counter electrode.

Shown in Table 2 is the data for ten days of electrochemical tests using SOTF as the anode.

TABLE 2

Potentiostatic corrosion of stannic oxide thin film Anode potential = 1.058 V vs S C E Platinum cathode in 5.301 M $H_2SO_4$ at 22° C.

| TIME (DAYS) | RESISTANCE Ω (20° C.) |
|---|---|
| 0 | 8.12 |
| 2 | 8.11 |
| 7 | 8.11 |
| 10 | 8.12 |

With a potential of +1.06 V relative to a calomel electrode, the stannic oxide film did not show a change in resistance within the measurement uncertainty of the experimental apparatus.

The results of using the stannic oxide film as the cathode in the electrochemical cell are shown in Tables 3, 4 and 5.

TABLE 3

Potentiostatic corrosion of stannic oxide thin film Cathodic potential - 0.695 V vs S C E Platinum anode in 5.301 M $H_2SO_4$ at room temperature

| TIME (HRS) | RESISTANCE Ω (20° C.) | $R_T/R_o$ |
|---|---|---|
| 0 | 7.85 | 1.00 |
| ½ | 10.65 | 1.35 |
| 1½ | 16.53 | 2.10 |

TABLE 4

Potentiostatic corrosion of stannic oxide thin film Cathodic potential - 0.1 V vs S.C.E. Platinum anode in 5.301 M $H_2SO_4$ at room temperature

| TIME (HRS) | RESISTANCE Ω (20° C.) | $R_T/R_o$ |
|---|---|---|
| 0 | 7.745 | 1.000 |
| 66 | 7.756 | 1.001 |
| 90 | 7.754 | 1.001 |
| 130 | 7.753 | 1.001 |

TABLE 5

Potentiostatic corrosion of stannic oxide thin film Cathodic potential - 0.350 V vs S C E Platinum anode in 5.301 M $H_2SO_4$ at room temperature

| TIME (HRS) | RESISTANCE Ω (20° C.) | $R_T/R_o$ |
|---|---|---|
| 0 | 7.599 | 1.000 |
| ½ | 7.622 | 1.003 |
| 1 | 7.641 | 1.005 |
| 2 | 7.667 | 1.009 |
| 3 | 7.678 | 1.010 |
| 5 | 7.868 | 1.011 |
| 7 | 7.696 | 1.012 |
| 24 | 7.863 | 1.034 |
| 30 | 7.933 | 1.043 |
| 95 | 9.589 | 1.261 |
| 115 | 9.981 | 1.313 |

TABLE 5-continued

Potentiostatic corrosion of stannic oxide thin film
Cathodic potential - 0.350 V vs S C E
Platinum anode in 5.301 M $H_2SO_4$ at room temperature

| TIME (HRS) | RESISTANCE Ω (20° C.) | $R_T/R_o$ |
|---|---|---|
| 163 | 10.873 | 1.430 |

It was found that significant deterioration occurs at both −0.70 V and −0.35 V. Reducing the potential to −0.10 V stopped the electrochemical corrosion. Over a five day period, there was no measureable change in film resistance.

After 33 days of conducting chemical corrosion testing, using electrical resistance as the criteria, less than 1/1000 change was detected in the measurements, i.e., the standard deviation is less than 1/1000. Since the error bar in the measurement may be a maximum 2/1000, a conservative approach to extrapolating the data is to assume an increase of 2/1000 in the film resistance every 30 days. At this rate of degradation, the SOTF (stannic oxide thin film) would take 20 years to double the initial electrical resistance.

The electrochemical corrosion resistance of the SOTF was determined in an electrochemical cell using the SOTF as either the positive or negative electrode and with Pt foil as the counter electrode. The cell was set up with a saturated calomel reference electrode (SCE) which was used to fix the potential of the SOTF electrode. As before, 5.3 M sulfuric acid was used and all electrochemical tests were run at 20° C. The SOTF electrode (coated glass plate) was removed periodically from the electrochemical cell and measurements were made of the films. Using the SOTF as the anode (positive electrode with a potential of +1.06 V versus SCE), less than 1/1000 change in electrical resistance was measured after 10 days of continuous running. Given this limited data, it would take approximately seven years for the SOTF to double the initial resistance value.

Another series of experiments were run using SOTF as the cathode (negative electrode) and Pt foil as the anode at 20° C. nitial runs, where the SOTF potential was set to −1.2 V relative to a SCE reference electrode, resulted in a complete degradation or corrosion of the thin film within a time frame of five to ten minutes. Running the electrochemical cell with SOTF at −0.70 V versus SCE and −0.35 V versus SCE resulted in a significant increase in film electrical resistance with time. For the case of −0.70 V, the resistance doubled with a time of 1 hour while for −0.35 V the time for doubling of resistance is estimated to be 14 days. Reducing the SOTF potential further to −0.10 V versus SCE resulted in no noticeable resistance change during five days. Consequently, the threshold potential for degradation of SOTF appears to be between −0.10 V −0.35 V versus SCE. Polarity reversal below −0.10 V must be avoided.

The plate of the invention is a liquid impervious, low resistance, through-plate conductor having application in any stacked electrochemical cell in which it is desired to provide conduction to an adjacent electrode or an adjacent cell. The plate can be used in batteries, electrolysis cells, fuel cells, electrophoresis cells, etc. The plate can be used in cells with vertically or horizontally disposed cells. The preferred cell configuration is horizontal since horizontal disposition of a cell prevents electrolyte stratification and the continuous, flat surface of the bipolar plate of the invention will prevent shedding of active electrode material, the most prominent failure mode for lead-acid cells.

A particular, efficient, horizontal battery configuration is disclosed in my copending application, Ser. No. 279,841, filed July 2, 1981, entitled BIPOLAR SEPARATE CELL BATTERY FOR HIGH OR LOW VOLTAGE, the disclosure of which is expressly incorporated herein by reference. In that application, bipolar plate groupings are placed between monopolar plates to increase available potential voltage. The conductive plate of the invention can be utilized as a substrate to form either the bipolar plate or a positive monopolar plate of such a battery. A monopolar plate will differ in having the same polarity material provided on each surface thereof, and means to provide lateral conduction to provide for parallel connection to cell groupings.

Figure 6:
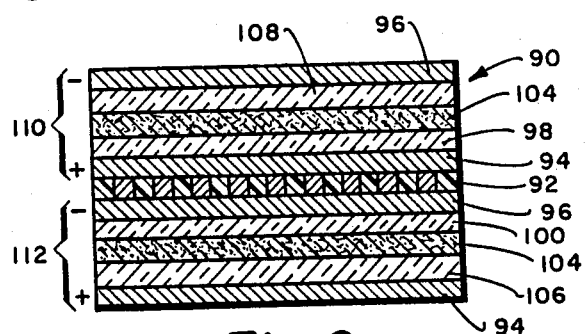
FIG. 6 is a view in section of a stack of planar plates forming a battery cell.

Referring now to FIG. 6, a biplate groupings 90 can be assembled surrounding a through-conductive plate 92 of the invention by supporting a layer 94 of positive active lead dioxide material on a first glass scrim sheet 96 and a layer 98 of negative active sponge lead on a second sheet 100 of glass scrim. These sheets 96, 100 are then placed against the plate 92 with the active layers 94, 98 in contact with the surfaces of the plate 92. The scrim sheets are in turn faced with a porous, fibrous mat 104 suitably formed from glass fibers. The porous mat is capable of releasing any gases formed during operation of the cell and holds the electrolyte. The sheets of scrim fabric 98. 100 may be bonded to the mats 104. By bonding an opposite polarity scrim sheet 106, 108 to each mat 104, a bipolar grouping can be assembled by alternating layers of plates 92 with bipolar porous mat assemblies 110, 112.

The bipolar groupings can be interspersed with monopolar plates connected by bus bars to battery terminals. Alternately, the electrode materials can be plated directly onto the through-conductive substrate plate of the invention. For example, sponge lead can be coated onto one surface and lead dioxide can be coated directly onto the other surface or indirectly onto lead strips coated onto the opposite surface. Bipolar groupings are formed simply by interspersing a porous electrolyte-separator plate between the active material coated bipolar plate. The active materials can be applied as pastes and cured on the scrim or plate according to state of the art procedures. The active materials can also be formed in situ according to the state of the art by applying lead to each surface and then placing the electrode materials in electrolyte and connecting them to a source of potential.

It is to be realized that only preferred embodiments of the invention have been described and that numerous substitutions, modifications and alterations are permissible without departing from the spirit and scope of the invention as defined in the following claims.

I claim:

1. A method of forming a through-conductive plate comprising the steps of:
   dispersing conductive tin oxide coated glass in a softened resin; and
   forming the resin into a sheet.

2. A method according to claim 1 in which the glass is a glass fiber having a diameter from about 1 to about 20 microns.

3. A method according to claim 2 in which the tin oxide is present as a coating having a thickness from a monolayer to about 10 microns.

4. A method according to claim 3 in which the coated fibers are present in the resin in an amount from about 20 to about 80 percent by weight.

5. A method according to claim 4 in which the resin is a polyolefin.

6. A method according to claim 5 in which the resin is polypropylene.

7. A method according to claim 6 in which the sheet of glass is a sheet of woven fiberglass fabric or a sheet of sintered glass.

8. A method according to claim 1 in which said plate has a thickness from about 1 to about 20 mils.

9. A method according to claim 1 in which a protective layer selected from thin films of metal and a film of resin containing a dispersion of conductive particles is disposed on a surface of the plate.

10. A method according to claim 9 in which the particles are fibers selected from lead or graphite.

11. A method according to claim 1 in which the glass is in the form of particles or fibers.

12. A method according to claim 1 further including the step of adhering a conductive film to a surface of the sheet.

13. A method according to claim 12 in which a mixture of fibers in molten resin is cast onto a surface of said film.

14. A method according to claim 1 in which a sheet of tin oxide coated glass is placed adjacent a sheet of thermoplastic resin to form an assembly and the assembly is heated and pressed to imbed the sheet of glass into the sheet of resin.

15. A method according to claim 14 further including placing a film of conductive material that is stable in a reducing environment adjacent the other surface of said sheet of resin before the heating and pressing step.

* * * * *